United States Patent
Pralus et al.

[11] Patent Number: 6,055,312
[45] Date of Patent: Apr. 25, 2000

[54] TELEPHONE HANDSET CONVERTIBLE INTO A TELEPHONE HEADSET

[76] Inventors: Charles Pralus, "Mas Saint Antoine" 68 Chemin du Carignan 06130, Grasse; Bruno Bazire, 23, Impasse Cauvin 06530, Peymeinade, both of France

[21] Appl. No.: 09/000,354
[22] PCT Filed: Mar. 27, 1997
[86] PCT No.: PCT/FR97/00556
  § 371 Date: Dec. 10, 1998
  § 102(e) Date: Dec. 10, 1998
[87] PCT Pub. No.: WO97/37480
  PCT Pub. Date: Oct. 9, 1997

[30] Foreign Application Priority Data

Mar. 28, 1996 [FR] France .................................... 96 04136

[51] Int. Cl.⁷ .................................................. H04M 1/00
[52] U.S. Cl. ............................................................ 379/430
[58] Field of Search .................................... 379/430, 433; 381/370, 374, 375–379, 383

[56] References Cited

FOREIGN PATENT DOCUMENTS

| 0 343 875 | 11/1989 | European Pat. Off. . |
| 2 669 799 | 5/1992 | France . |
| 94 17 003 | 1/1995 | Germany . |

*Primary Examiner*—Jack Chiang
*Attorney, Agent, or Firm*—Pearne, Gordon, McCoy & Granger LLP

[57] ABSTRACT

This invention relates to a telephone handset transformable into a telephone headset. The assembly includes a main unit (10) fitted with a first receiver and a microphone and a unit (12) movable in relation to the main unit that can incorporate a second receiver. The movable unit (12) is connected to the main unit (10) by a connecting component (14) made up of at least two arms (26, 28) adjustable in length and at least partially retractable. They are connected by at least one articulation boss. The microphone is retractable or is integrated into the main unit and then articulated in relation to the connecting component. When the telephone unit passes to an open position, it is transformed into a telephone headset without interruption of reception or transmission.

12 Claims, 4 Drawing Sheets

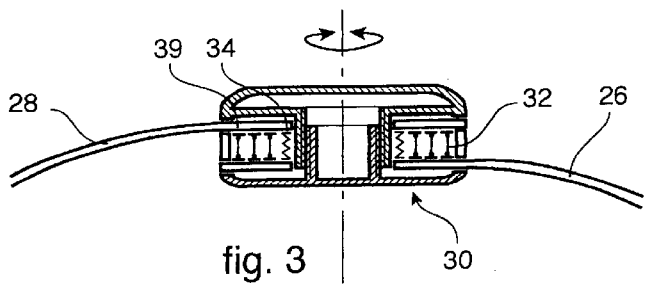
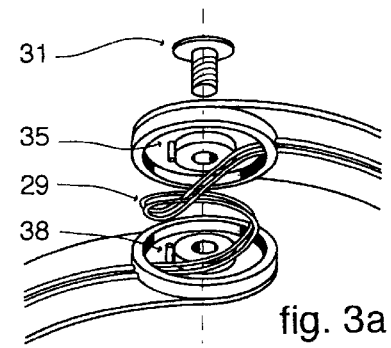
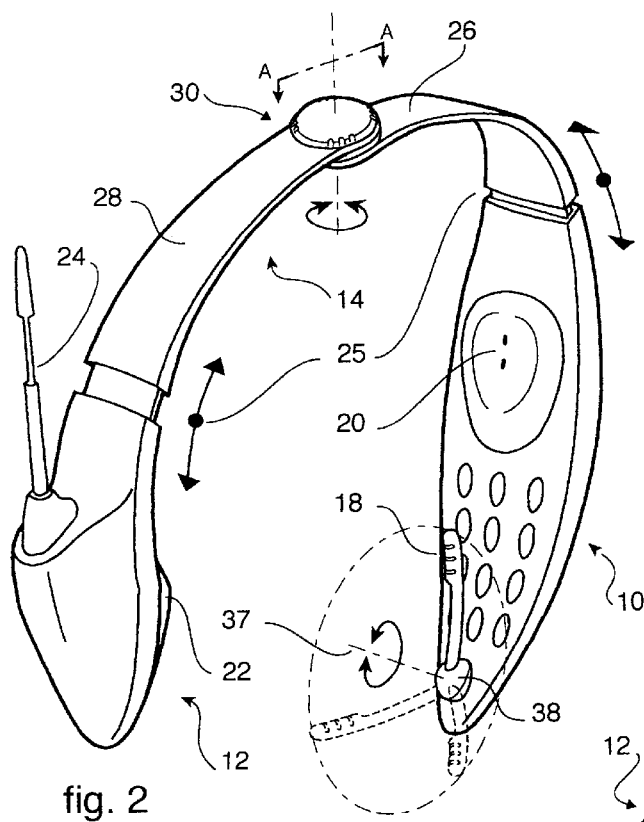
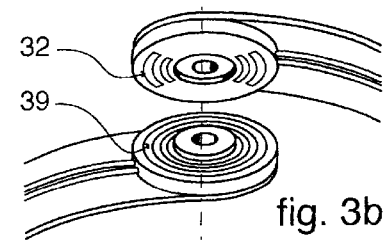
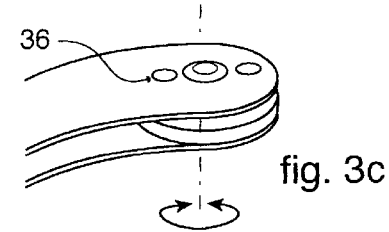
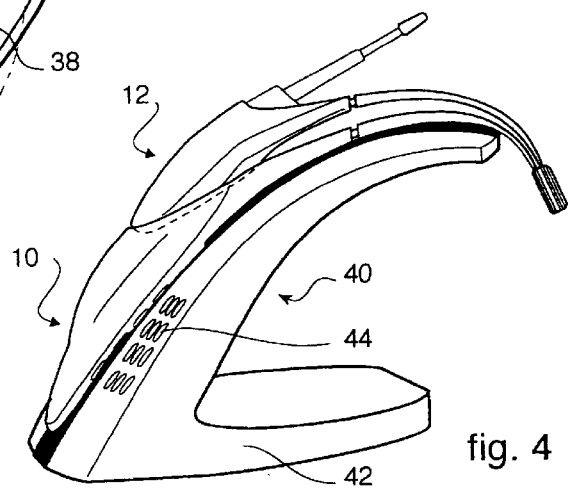

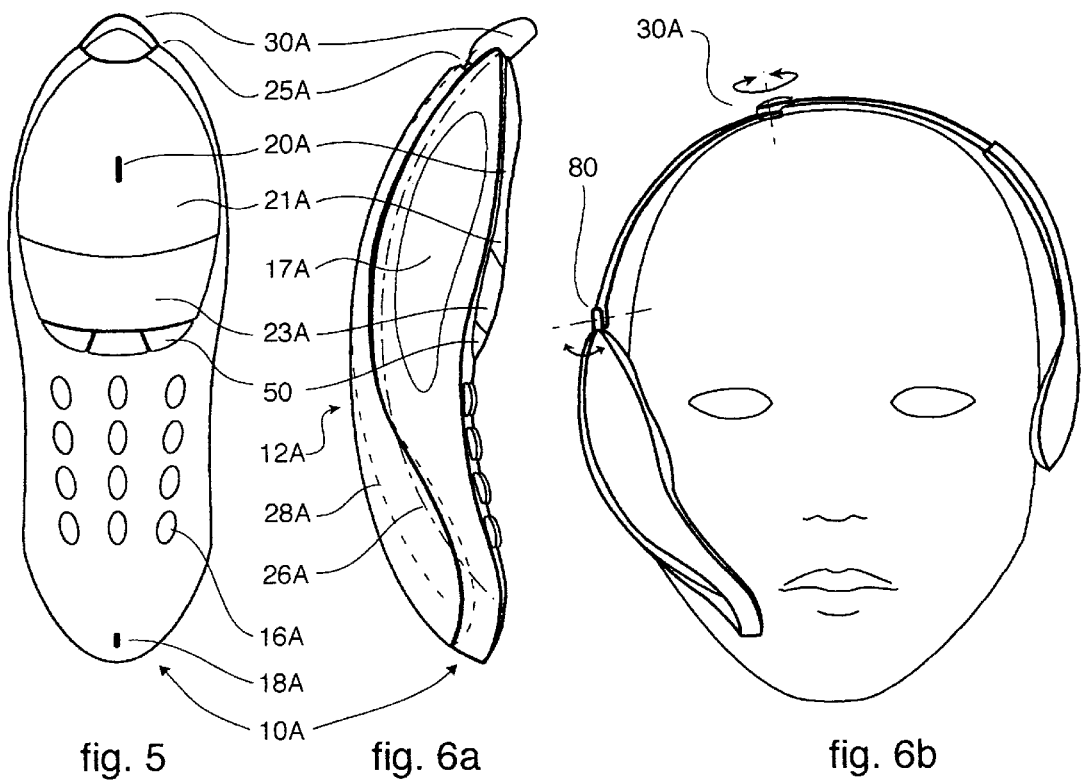
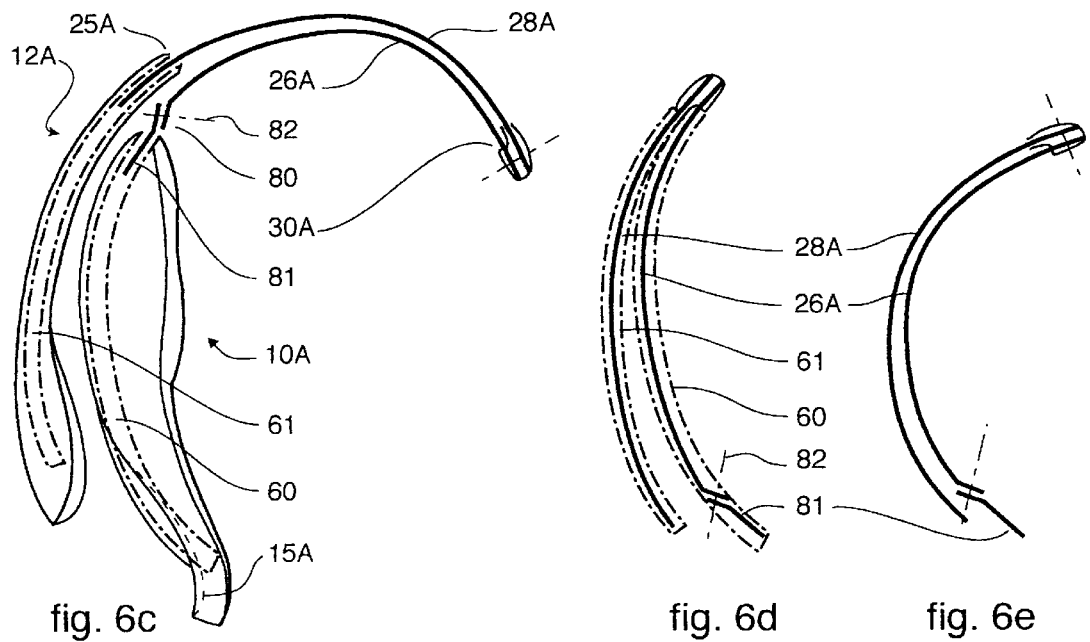
fig. 5  fig. 6a  fig. 6b  fig. 6c  fig. 6d  fig. 6e

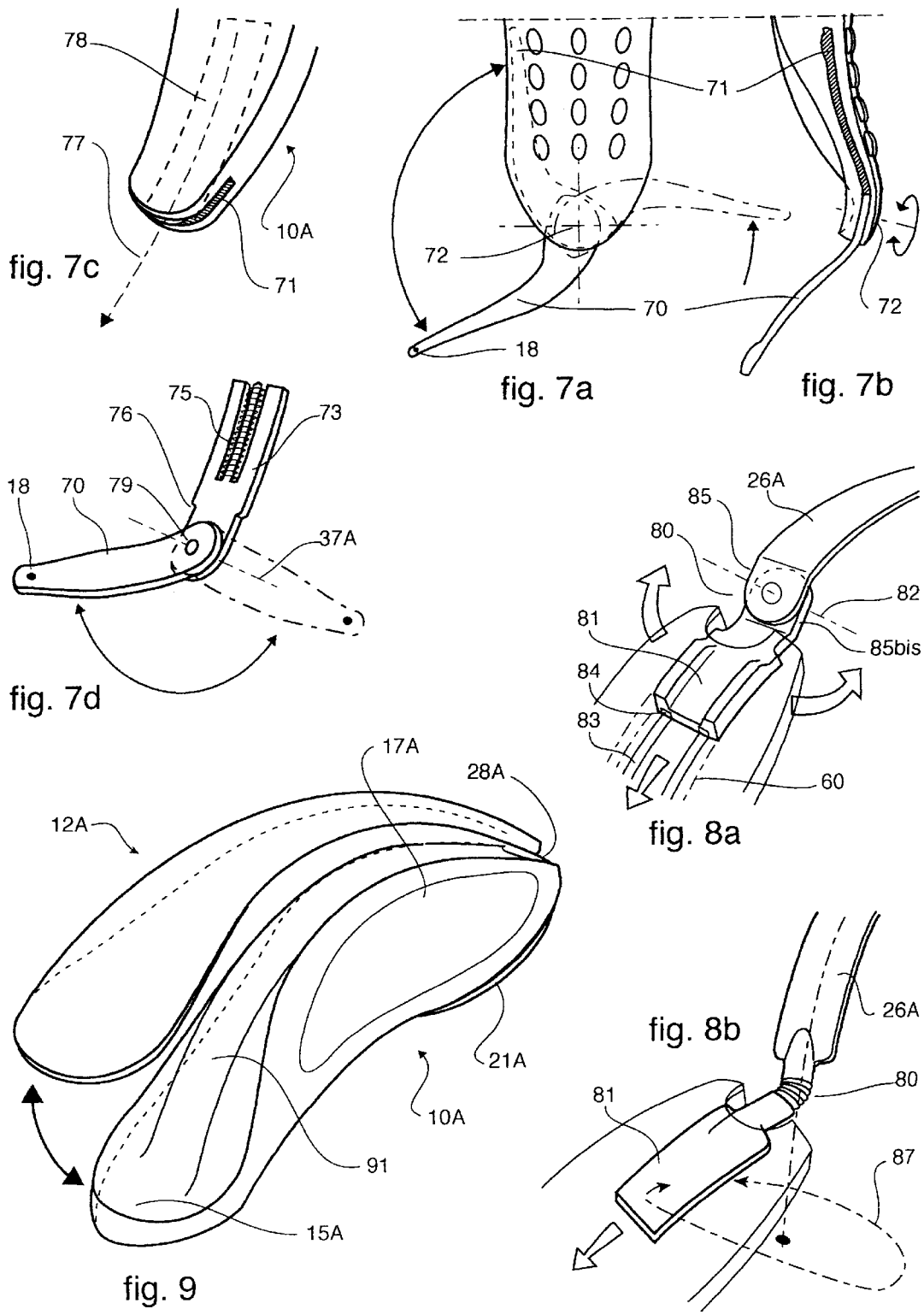

TELEPHONE HANDSET CONVERTIBLE INTO A TELEPHONE HEADSET

This invention relates to a telephone handset, transformable into a telephone headset that does not require the telephone handset to be held in the hand and provides a high level of listening and transmission convenience.

Present-day telephone handsets are designed to be held in the hand during the telephone conversation. This poses a problem when the user needs to use his two hands during the conversation, for example to look for a file, to write, to use the keyboard of a computer or a typewriter as well as on many other occasions.

In order to have free hands, most often the user jams the handset between his shoulder and his ear and tries to hold it there with difficulties that are well known.

On the other hand, use of a traditional handset in the usual way does not allow filtering out of ambient noise. In the event of nearby nuisance noise, the user is sometimes obliged to put his hand over his free ear in order to hear his caller better. On the other hand, when the telephone handset has a loudspeaker and the handset is used in "free hands" mode (in an office for example) the transmission seems far away and the sound is difficult to hear for the caller.

These problems have been partially resolved by the use of telephone headsets. For a long time, there have been headsets of this type, essentially for professional use. They include two receivers connected to one another by a metal or plastic strip in order to hold the headset on the head with a flexible microphone, which is positioned at the height of the lips. It is an essential requirement that the headset is correctly fitted on the head, with adjustment of the receivers even for a very short conversation. Finally, being connected to a switchboard by a wire, they do not allow any movement beyond a limited range.

However cordless telephone headsets do exist that include, in addition to the microphone and the receivers, a transmission unit generally attached to the user's belt. The transmission unit is an encumbrance and furthermore this type of apparatus assumes that on receiving a call signal, one proceeds with the preliminary fitting of the headset, then its adjustment and this just for a conversation of a few seconds.

These devices which are not very compact do not therefore provide two solutions in a single unit and do not provide the alternative, compact handset which is capable of being developed into a receiver deployed as a headset.

The two types of equipment are quite distinct:
a telephone handset on the one side
a headset on the other, all of them generally being connected by a wire.

Hence telephone equipment has been envisaged having the shape of a traditional telephone handset, but fitted with telescopic strips that allow a second receiver to be deployed and thereby transform the handset into a telephone headset. Documents EP-A-0 343 875, EP-A-0 401 007 and FR-A-2 669 799 describe different telephone handsets that can be transformed into a telephone headset according to this technique. Unfortunately, this type of apparatus has a certain number of disadvantages making it unusable in its "telephone headset" version. In effect, when deployed by sliding the telescopic strips, the strips can catch on the hair of the user. Furthermore, the shape of the strips forming an arc of a circle, imposed by making them capable of being put back into the handset does not correspond to the shape of the head which is oval and not round. The spring effect of the receivers is not then provided, these are not properly positioned over the ears and the headset is then in an unstable equilibrium. On the other hand, the microphone being in the axis of the strips, it rests against the neck of the user which is uncomfortable and does not allow good transmission quality. Document EP-A-0 343 875 resolves this difficulty by allowing the microphone to have a limited angle of rotation, after a sliding movement. However, this is not a very easy operation. Manipulation is delicate, when it is necessary to deploy the ear-phones and above all, when the strips must be returned into the handset by sliding one against the other. In addition, this type of apparatus does not respond to the demand for miniaturisation.

In addition, it must be observed that in all known equipment with telescopic strips, the shape and the dimensions of the handset arise directly from the curvature and the length of the telescopic strips. The production of a particularly compact handset, without excessive curvature and with a clean shape is therefore not possible in practice.

In document DE-U-94 17 00, various solutions have been outlined so as to keep the hands free during a telephone conversation. One of these solutions consists of a telephone headset provided with a headband that can be folded up and in which a microphone is fixed onto a bracket that pivots on the headband. The transformation of the telephone headset into a traditional telephone handset is not considered.

This is why the aim of the invention described below is to remedy all these disadvantages by providing a telephone handset transformable into a telephone headset, in an easy, simple and rapid fashion providing greater listening comfort, usable in either hand in the handset (closed) position and allowing both hands to be available in the headset (open) position.

Conforming to the invention, this result is obtained by means of a telephone handset transformable into a telephone headset, including a main unit fitted with a receiver and a microphone, a unit, movable in relation to the main unit and a connecting component linking said units, this connecting component including at least two flexible and curved arms, capable of being, at least partially retracted, by sliding into at least one of said units, characterised by the fact that the arms are connected to one another by at least one means of articulation that allows relative movement of said units between a handset position in which (in order to prevent any rotation) the movable unit is received in a housing formed in a rear face or on the side of the main unit and the arms are, at least partially, retracted into each of said units, and a headset position, in which the two arms are positioned in extension one from the other and are taken out from said units to a length suited to the anatomy of the head of the user.

In the closed position, the apparatus has a compact appearance and can be used in one hand only, exactly like a telephone of the traditional kind, for example for a very short conversation. This telephone handset is therefore intended for private individuals as much as for professionals since it does not require prior fitting of the headset and its adjustment before taking the call. It can equally well be adapted to analog and digital technologies.

The invention offers a possibility of alternative use by grouping together two integrated solutions in a single compact device. On the one hand a homogenous telephone handset for traditional use and on the other hand a telephone apparatus arranged as a headset. When one passes from the closed position to the open position, the telephone handset is transformed into a telephone headset, and this is done easily and without disturbing or interrupting the transmission or the reception of the call. It then allows the user to have both hands available. The position in headset mode, due to receivers being applied to each ear, allows a very great improvement in listening comfort, particularly in a noisy environment thanks to the double hearing and to the covering of the ears.

The invention is matched to the anatomy of the head so that the two receivers are perfectly positioned vis a vis the ears and that the pressure exerted by the spring effect of the connecting component keeps the headset in proper equilibrium on the head. The arms are not round but have an elliptical profile designed in relation to the shape of the skull. It is the association of the rotation with the adjustment of the length of the headset arms that allows adaptation to the anatomy of the head in a simple and rapid way. It is not necessary to raise the hands higher than the ears, reducing movement difficulties for many people, in particular the aged.

The distance between the ear and the base of the neck not being more than about ten centimetres, the dimensions of the handset of the invention takes account of the distance between the receiver and its lower extremity so that the equipment does not touch the neck of the user in headset mode.

Advantageously, in the handset position, the arms are retracted into slide chambers formed respectively in the main unit and in the movable unit, in such a way that the sweep of the curves of the arms is reduced substantially in relation to the sweep of the curves formed by the arms in the headset position, thereby reducing the thickness of the handset and its general curvature.

Preferably, the means of articulation is a rotation hub that permits relative rotation of said units of at least 180°, about an axis oriented substantially radially in relation to the curved arms.

In one preferred embodiment, the movable unit includes a second receiver.

The means of articulation then contains means of electrical transmission between the wires passing within the arms.

Preferably, the means of articulation includes a means of adjusting the relative position of the arms.

The microphone can be movably mounted on the main unit, by a fulcrum pin, a ball joint or a flexible stem.

The microphone can also be integral to the main unit and a second articulation means provided between a first arm and a slide block housed in the main unit.

In this latter case, the second articulation means includes either a ball joint, or a rotation spindle inclined towards the interior of the first curved arm, in relation to a radial direction vis a vis said arm.

The aims, objectives and characteristics of the invention will better emerge on reading the description which follows and which refers to the drawings in which:

BRIEF DESCRIPTION OF THE DRAWINGS

For the first embodiment of the invention:

FIG. 2 represents a perspective view of the telephone handset according to the invention in the open position ;

FIG. 3 represents a section along A—A of the rotation hub,

FIGS. 3a and 3b represent a perspective view of the open rotation hub,

FIG. 3c is a perspective view of the rotation hub in the closed position,

FIG. 4 represents a profile view of the telephone handset placed on its telephone stand.

Figures 1A, 1B:
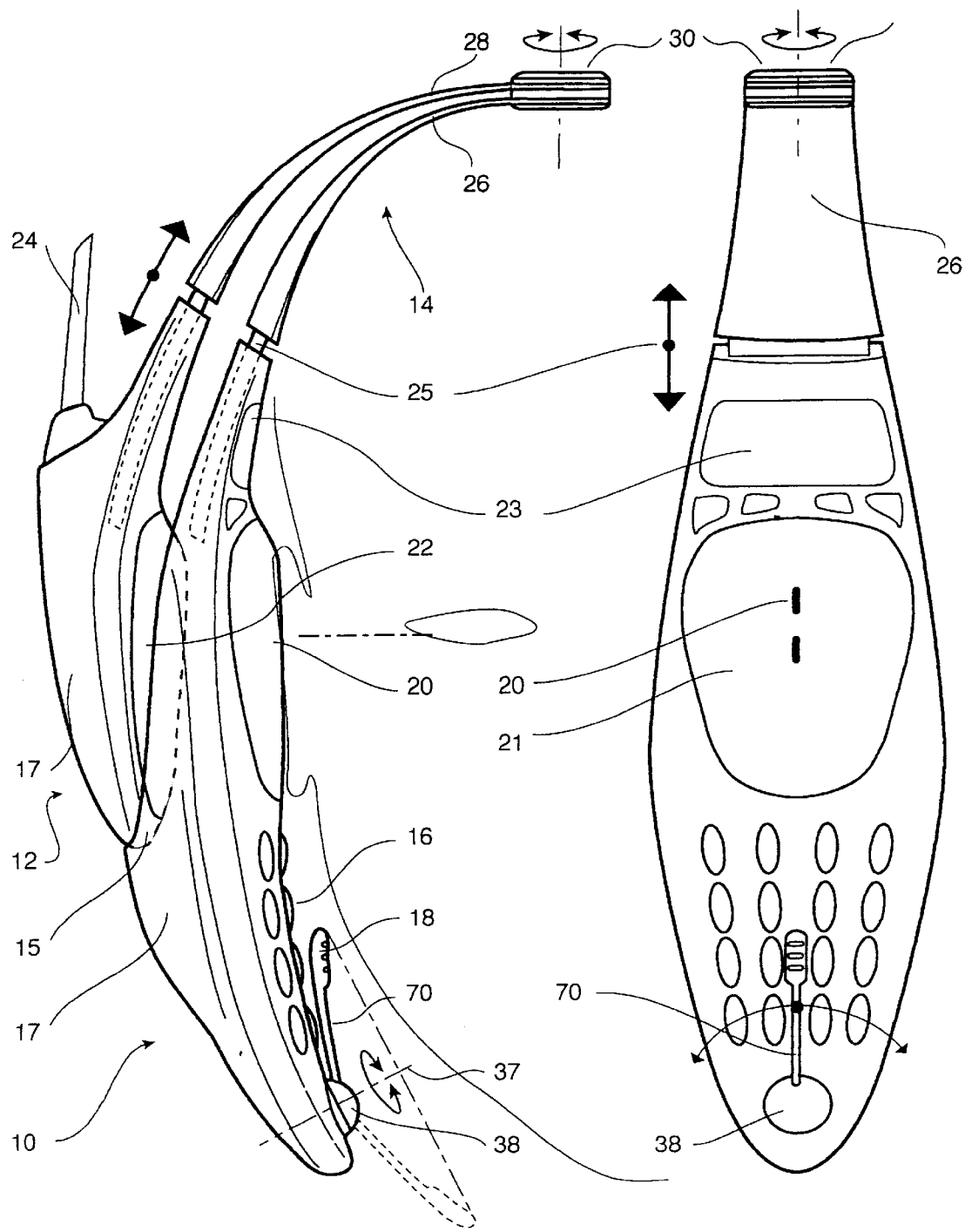
FIG. 1a represents a profile view of the telephone handset according to the invention in the closed position.
FIG. 1b represents a front elevation of the telephone handset according to the invention in the closed position.

For the second embodiment of the invention ;

FIG. 5 represents a front elevation of a second embodiment ;

FIG. 6a represents a profile view, in the closed position of the apparatus in FIG. 5, FIG. 6b is in the open position, 6c in the opening position, FIGS. 6d and e compare the curves of the arms ;

FIGS. 7a, b, c, d represent different types of rotating microphones;

FIGS. 8a and 8b represent a detailed view of the means of articulation of the handset in relation to the connecting component;

FIG. 9 represents a perspective view of the telephone handset according to FIG. 5 in the position at the start of opening on its back.

DETAILED DESCRIPTION OF THE PREFERRED EMBODIMENTS

FIGS. 1 to 4 represent a first embodiment of the invention.

The telephone handset according to the invention can either be in the closed position (or handset position) as illustrated in FIGS. 1a and 1b, or in the open position (or headset position) as illustrated in FIG. 2. It includes a main unit 10 and a movable unit 12 linked to one another by a connecting component 14 as will be seen in the following.

The main unit 10 traditionally includes a key pad 16, a microphone 18, a receiver 20 and can also incorporate a liquid crystal display 23 (FIGS. 1a and 1b).

The main unit can also be fitted with vocal recognition technology.

The electronic components are not represented since they are known of themselves.

In the case of the cordless telephone handset which is the subject of the preferred embodiment, the main unit 10 incorporates a rechargeable or exchangeable internal battery 17. The movable unit 12 includes principally a second receiver 22, a telescopic or fixed aerial 24, shown in FIG. 2 and possibly another battery, This aerial would obviously not be necessary if the telephone handset were a traditional system connected by wires to the telephone network, or if a device would allow the arms to be used as an aerial, or any other device concealing the aerial inside the units.

In the closed position, or handset position, the movable unit 12 is positioned against the main unit 10 in a sort of housing 15 provided for this purpose and which is located at the back or on the side (not shown) of the main unit 10. The spring effect of the exterior arm 28 allows it to be held in this housing thereby stopping rotation. The handset is then compact in the hand, since there is only one unit and it can then be used with just one hand like a traditional telephone handset. The receiver of the handset is then placed against the auditory pavilion of one or the other ear of the user.

The connecting component 14 is made up of two arms 26 and 28 connected by a means of articulation 30 which is here a rotation hub (FIGS. 2, 3, 3a, 3b, 3c). The arm 26 is integral with the main unit 10, while the arm 28 is integral with the movable unit 12. The two arms are flexible and have available a length adjustment system 25 so that the assembly can be adapted to the different head sizes of the users in the open position, also reducing the space taken up by the length of the arms, in the closed position. In effect, in this latter case, the arms 26 and 28 are partially retracted, by sliding, into the units 10 and 12.

When the user wishes to use his telephone equipment as a headset, he simply pivots the movable unit 12 180°, causing the arm 28 to pass in front of the face to fit the second receiver 22 onto the ear opposite to the one over which the first receiver is. This can be done in a single movement without interrupting hearing and without moving the hand which is holding the handset (which can be either the right or the left hand). The telephone handset is then arranged as shown in FIG. 2.

For greatest possible comfort, these receivers can be covered with a synthetic foam or other flexible material 21.

In the open position or headset position, the telephone set is held on the user's head solely by the effect of pressure of the flexible arms of the headset. It allows the hands to be completely available and to have total freedom of movement. The fact that the greatest mass is situated below the ear during use in headset mode, and not between the two arms, significantly improves the holding of the headset on the head particularly when the user leans his head forward. The rechargeable or exchangeable batteries can be distributed in the main unit and the movable unit. In the open position, the two arms 26, 28 are positioned in extension one from the other and are taken out of units 10, 12.

In the preferred embodiment, the means of articulation 30 is a rotation hub shown in FIGS. 3 and 3b. It includes a system for adjusting the position of the arms. It is fitted with a spring 34 that applies sufficient force to hold the arms 28 in the closed or open positions thanks to locating notches. An adjusting screw 31 allows this pressure to be increased. This screw may also only be used for fixing. This hub may only contain a part of these different elements, as in FIG. 3b for example.

The hub contains one or several washers 39 to provide the electrical contact for the wires 29 passing within the arms and one or several shoes 32 which rub against the washers as illustrated in FIG. 3. The electrical wires can be either:

printed onto the arms embedded into the thickness of the arms if they are made of plastic material inserted into a specific profile of the arms (a groove)

This hub may have any other electrical or electronic system that allows contact and allows complete rotation of the arms such as transmission through infra-red contactors 36, for example (FIG. 3c).

The thickness of the hub allows separation of the two arms of a few millimetres, avoiding the effect of them gripping the hair.

It should be observed that, in another possible embodiment, the arm 28 and the movable unit can pivot:

either through a complete rotation of 360°, without a stop 38 as illustrated in FIGS. 3, 3b and 3c;

or through a rotation of just less than 180° (of one side or the other starting from the closed position), that is to say by passing in front of the face of the user or behind the head, since a stop 38 (FIG. 3a) blocks complete rotation. In the case of a hub with a stop 38, this allows uncut wires 29 to be passed within a cylindrical space 35 inside the rotation hub 30, without any need for a system of electrical contactors.

The means of articulation may not contain electrical contactors, if the transmission of the sound between the main unit and the receiver of the movable unit takes place, not through wires, but by waves. For example, radio waves (FM) or infra-red waves. In this case, an independent battery in the movable unit, powers the wave receiver.

Although the means of articulation 30 is, preferably, a rotation hub, a ball joint may be fitted that allows articulation of the arms with respect to one another in any direction about an articulation point and not only in a single rotation plane (not shown). With such a ball joint, the arm 28 of the headset can be deployed above the head in order to pass from the closed position to the open position without passing it in front of the user's face.

The microphone 18, mounted on a stem 70, is also adjustable, as illustrated in FIGS. 1a, 1b and 2 where it pivots about a spindle 37 integral with the main unit. In order to direct it towards the user's lips, it suffices to subject the microphone to a rotating movement. It is therefore possible for the user to grasp the handset with the right hand just as well as with the left hand. The rotation of the microphone could be used for line connection, this rotation being able to cause passage from the "OFF" position to the "ON" position.

It is possible to provide integration of the stem 70 of the microphone with the handset via a ball joint 38, or a flexible stem, that allows articulation of the microphone from one side or the other of the main unit according to where the mouth is.

The stem 70 of the microphone in the closed position can be stored, by rotation in a housing provided for this purpose, either on the interior surface (FIGS. 1a, 1b and 2) or exterior surface of the handset if said rotation hub is positioned on the exterior surface of the main unit, or in a housing inlaid into the thickness of the main unit when the rotation hub 72 is invisible, that is to say, on the inside of the main unit as shown in FIGS. 7a and b.

In another possible embodiment of the microphone shown in FIGS. 7c and 7d, the telescopic microphone stem, straight or curved 70, is mounted on a slide block 73 which moves in a slide 78 inside the main unit 10A, allowing the microphone to be taken out or put back completely, up to a stop 76, in the axis 77 of the main unit. At the interior end of the stem 70 there is a rotation hub 79 that allows the microphone to be pivoted, once taken out, along axis 37A, from one side or from the other of the main unit according to where the mouth is. A spring 75 mounted on the slide block 73 and released by a button (not shown) allows ejection of the stem 70 of the microphone and possibly connection of the line through an electrical contact (not shown) on the stop 76. Power supply to the microphone is made through wires and through contactors situated within the rotation hub 79.

In another possible embodiment (not shown), a protective door (a cover) for the buttons on the key pad 16 disengages itself from the body of the main unit, then slides or turns in one or several planes thanks to a pivoting boss freeing up access to the key pad. This door contains the microphone and the wires that supply power to it and is positioned in the open position on one side or the other of the main unit in order to be nearest to the mouth.

In all cases, the microphone can be taken out automatically by pressing a button which releases a spring mechanism that allows the microphone to slide or to pivot from its housing to the outside into a using position.

Second Embodiment of the Invention.

FIGS. 5 to 9 represent a second embodiment of the invention. All the components of this second embodiment that correspond to similar components in the first embodiment are designated with the same references, with the addition of the suffix "A". Furthermore, the characteristics and the operation of this second embodiment of the invention are similar to the details given in the explanation of the first embodiment with the exceptions indicated below.

FIGS. 5 to 9 represent a telephone handset transformable into a telephone headset, in which the movable unit 12A and the connecting components 14A adjustable in length 25A, are connected to the main unit 10A by several means of articulation 30A, 80 which allow them to be positioned along the main unit, either on the side or, in a favoured way, on the back face of the unit 10A, in order to reduce the space occupied by the handset.

In this second favoured embodiment, the connecting component 14A is made up of two arms 26A and 28A connected by several articulation means 30A and 80 (see FIGS. 6b, c, d, e and 8a and b) which here are two rotation hubs (FIG. 3 or 3a, b, c and 8a). In a favoured way, the arm 26A is connected to a slide block 81, received in the main unit 10A, through the use of a rotation hub 80 (FIG. 8a) while the arm 28A is capable of sliding in the movable unit 12A without rotation. The two arms 26A and 28A are connected to one another by at least one articulation means 30A. These two arms are flexible with a spring effect and have available a length adjustment system 25A so that the assembly can be matched to the different head sizes of users in the open position and also substantially reduce the space occupied by the length of the arms, in the closed position.

When the user wishes to use his telephone as a headset, it suffices for him to grasp the movable unit 12A to take it out of its housing 15, 15A and 91, then to deploy it by pulling on the telescopic strips and at the same time pivot it through 180° by causing the outside arm 28A to pass in front of the face to fit the second receiver 22A against the ear opposite to the one against which the first receiver 20A is to be found. This can be done in a single movement, without interrupting reception. The telephone handset is then arranged as illustrated in FIG. 6b.

The deployment of the headset can also be done in three steps (which can be simultaneous):

1) Rotation of the outside connecting component 28A with its movable unit 12A in relation to the inside connecting component 26A and to the main unit 10A, around the rotation hub 30A.
2) Extension of the strip of the outside connecting component 28A from its housing 61 in the movable unit 12A and extension of the strip of the inside connecting component 26A and of the slide block 81 from its housing 60 in the main unit 10A, in order to adjust its length 25A and adapt it to the anatomy of the head.
3) Rotation of the main unit 10A and of the slide block 81 in relation to the inside connecting component 26A, about the rotation hub 80, for the adjustment of the angle of the apparatus (see FIGS. 8a and b) so that the microphone 18A (FIG. 5) situated in the lower part of the set is positioned close to the mouth.

In the case of embodiments represented in FIGS. 7a, b, c and d, step No. 3 of the deployment, will be replaced by taking out the rotatable microphone, for example by actuating an automatic ejection mechanism of the spring type mounted on a stem 75 represented in FIG. 7d, by a button, and adjusting it to be close to the mouth.

FIG. 6c shows the slide chambers 60 and 61, with the arms 26A and 28A taken out. The inside strip 26A of the connecting component slides in a slide chamber 60 on the back of the main unit 10A, thereby reducing the space occupied by the length of the arms, in the closed position. This slide chamber 60 restricts the spring effect of the strip in order to make it flatter (see FIGS. 6d and 6e), thereby reducing the sweep of the curve of the arm 26A, in relation to the sweep of the curve of this same arm in the headset position. The thickness of the main unit is thus reduced as well as its general curvature.

The outside strip 28A of the connecting component slides in a slide chamber 61 in the movable unit, thereby reducing the space occupied by the length of the arms, in the closed position. This slide chamber 61 restricts the spring effect of the strip in order to make it flatter thereby reducing the sweep of the arm 28A, in relation to the sweep of the curve of this same arm in the headset position. The thickness of the movable unit 12A is therefore also reduced while its general curvature means that the whole handset is less thick and its general curvature is flattened.

FIGS. 6d and 6e allow comparison of the curves of the arms 26A and 28A constrained in their slide chambers in FIG. 6d and the spring strips, at rest, once taken out of their slide chambers in FIG. 6e, with the slide block 81 remaining in the same position.

By using a spring steel of the type with memory or a plastic material having these same qualities, despite the curves being restricted inside the slide chambers, the pressure of the arms will be sufficient to provide a good grip of the headset on the head, even if the user bends his head forward or backward.

FIG. 8a shows the means of articulation 80 of the inside arm 26a with the slide block 81, which allows, by rotation, one side or the other of the main unit to be inclined in relation to the inside connecting component 26A for adjustment of the microphone 18A, situated in the lower part of the main unit 10A, closer to the mouth. The plane of the axis of rotation 82 is not in the extension of the curve of the arm 26A. There is firstly, a curve for the inside arm 26A, then at its lower end, an angle followed by a small straight part 85, through which the axis of rotation 82 passes. The slide block 81 has its own curve in its lower part, followed by an angle and a small straight part 85bis through which the axis of rotation 82 also passes. This inclination of the axis of rotation 82 towards the inside of the arm 26A, in relation to a radial direction vis a vis this arm, allows the main unit to be appreciably moved away from the cheek during the rotation.

FIG. 8b shows a variant to the changing of the plane through an axis of rotation. An articulation ball joint 80 can be provided following a movement plane 87 of the slide block 81 mounted in the main unit 10A. This movement plane 87 is calculated in order to have movement that is useful for bringing the microphone towards the mouth without weakening the pressure of the arms on the ears in order to do it.

The slide block 81 includes electrical contactors 84 which rub against electrical pins 83 situated in the slide chamber 60. The rotation hub 80 (FIG. 8a) and the articulation ball joint 80 (FIG. 8b) also include electrical contacts for the wires from the arm (26a). The arm 28A also includes electrical contactors at its lower end which rub on electrical pins (not shown) situated in the slide chamber 61 of the movable unit 12A.

FIG. 9 shows a perspective view of the back of the apparatus partially open. It shows that a longitudinal housing 91 is arranged in the back of the main unit 10A to receive the connecting component 12A in the closed position.

This housing 91 is deeper 15A in the part opposite the receiver of the movable unit. Once it is placed on the inside, thanks to the spring effect of the outside arm 28A, it allows the arm to be held located in this housing, thereby preventing any undesired rotation. The handset is then compact as if there was only one unit and the apparatus can then be used with one hand just like a traditional telephone handset. The handset receiver is then placed against the auditory pavilion of one or the other ear of the user.

The aerial, in a favoured way, will be integrated into the body of the handset or will be taken out either from the handset or from the movable unit.

These different technical innovations have the aim of effectively responding to the current need for miniaturisation of telephone handsets, by providing totally free use of the hands and improved hearing during use in headset mode.

The telephone handset whether cordless or not can be placed on a stand when not being used. This telephone stand 40, illustrated in side view in FIG. 4, includes a pedestal 42 that keeps it in an inclined position in such a way that the telephone handset resting on the stand can be easily picked up by the user. The stand 40 incorporates its own key pad 44 allowing the number being called to be keyed in without taking the handset off or while already having the apparatus in the hand or on the head. This stand can also be fitted with voice recognition technology.

In a general way, and mainly when it relates to a cordless telephone unit, the stand 40 can incorporate all the characteristics that can be found in a present day stand, that is to say, a line commutator, reception amplified through a loudspeaker, the possibility of communicating without lifting off the handset ("hands free" mode), automatic recharging of the batteries when the handset is on the stand, memorising of telephone numbers, modulation of the ringing and as an option an answering machine, and a liquid crystal screen that allows a display of the telephone functions.

We claim:

1. A telephone handset transformable into a telephone headset, including a main unit (10) fitted with a receiver (20) and a microphone (18), a movable unit (12) being movable in relation to the main unit (10) and a connecting component (14) linking said units (10, 12), this connecting component (14) including at least two flexible and curved arms (26, 28), the arms (26, 28) being at least partially retractable by sliding into at least one of said units (10, 12), characterized by the fact that the arms (26, 28) are connected to one another by at least one means of articulation (30) that allows relative rotation of the arms with respect to each other thereby allowing movement of said units (10, 12) between a handset position in which the movable unit (12) is received in a housing (15, 15A, 91) formed in a rear face or on the side of the main unit (10) and the arms (26, 28) are, at least partially, retracted into each of said units (10, 12), and a headset position, in which the two arms (26, 28) are positioned in extension one from the other and are taken out from said units (10, 12) to a length suited to the anatomy of the head of the user.

2. A telephone handset according to claim 1, in which, in the handset position, the arms (26A, 28a) are retracted into slide chambers (60, 61) formed respectively in the main unit (10A) and in the movable unit (12A), in such a way that the sweeps of the curves of the arms are substantially reduced, in relation to the sweeps of the curves formed by the arms in the headset position.

3. A telephone handset according to claim 1, in which the means of articulation is a rotation hub (30) that allows at least 180° relative rotation of said units (10, 12) about an axis oriented substantially radially in relation to the curved arms (26, 28).

4. A telephone handset according to claim 1, in which the movable unit (12) includes a second receiver (22).

5. A telephone handset according to claim 4, in which the means of articulation (30) contains electrical transmission means (29; 32, 39, 36) between the wires passing within the arms (26, 28).

6. A telephone handset according to claim 1, in which the means of articulation (30) includes a means of adjusting the relative position of the arms (26, 28).

7. A telephone handset according to claim 1, in which the microphone (18) can be movably mounted on the main unit (10) by a fulcrum pin (37), a ball joint (38) or a flexible stem.

8. A telephone handset according to claim 1, in which the microphone (18A) is integral with the main unit (10A) and a second means of articulation (80) is provided between a first (26A) of the arms and a slide block (81), housed in a slide chamber (60) of the main unit (10A).

9. A telephone handset according to claim 8, in which the second means of articulation (80) includes an axis of rotation inclined towards the interior of the first curved arm (26A), with respect to a radial direction vis à vis said arm.

10. A telephone handset according to claim 8, in which the second means of articulation includes a ball joint (80).

11. A telephone handset according to claim 3, in which the rotation hub (30) has a thickness such that the two arms (26, 28) are separated by a few millimeters.

12. A telephone handset according to claim 4, in which the transmission of the sound between the main unit (10) and the receiver (22) in the movable unit (12) occurs through waves.

* * * * *